United States Patent [19]
Martin

[11] 3,745,977
[45] July 17, 1973

[54] CATTLE AND HOG WATERING APPARATUS
[76] Inventor: Mervin W. Martin, 8028 Washington, Kansas City, Mo.
[22] Filed: Oct. 18, 1971
[21] Appl. No.: 190,149

[52] U.S. Cl.................. 119/73, 119/75, 119/78
[51] Int. Cl............................................. A01k 07/00
[58] Field of Search .................. 119/73, 72, 74, 75, 119/78, 79, 80

[56] References Cited
UNITED STATES PATENTS
1,912,530  6/1933  Kubler............................ 119/75 X
1,560,088  11/1925  Marquardt...................... 119/75 UX Primary Examiner—Hugh R. Chamblee
Attorney—D. A. N. Chase

[57] ABSTRACT

A water-receiving vessel particularly adapted for the watering of livestock in subfreezing weather has an upwardly facing drinking opening which is normally closed and sealed against heat loss from within by a buoyant, disc shaped valve within the vessel. The valve is composed of an insulating material and floats on the water in the vessel, and means is provided to maintain the water at a level below the opening but sufficiently high to hold the valve against an overlying seat therefor. The animal drinks by pushing the valve down into the water with its head, which causes the valve to tip and become partially submerged so that water then covers the submerged part and may be drunk. When the valve is released and rises to reclose, the water drains back into the vessel to thereby prevent the valve from freezing in the closed position.

8 Claims, 6 Drawing Figures

PATENTED JUL 17 1973
3,745,977
SHEET 1 OF 2
Fig. 1.
Fig. 2.
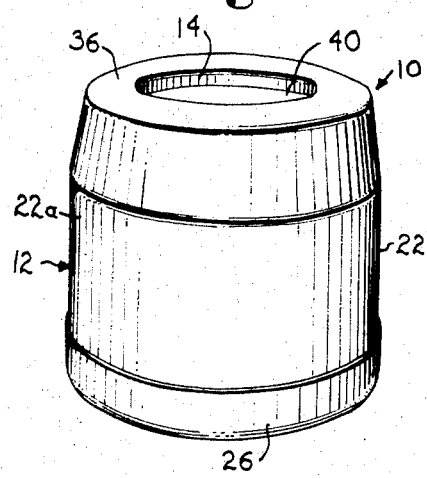
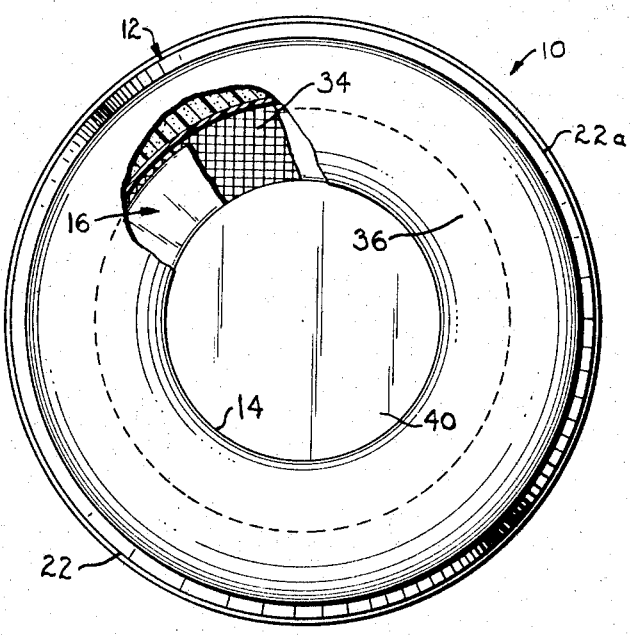
Fig. 3.
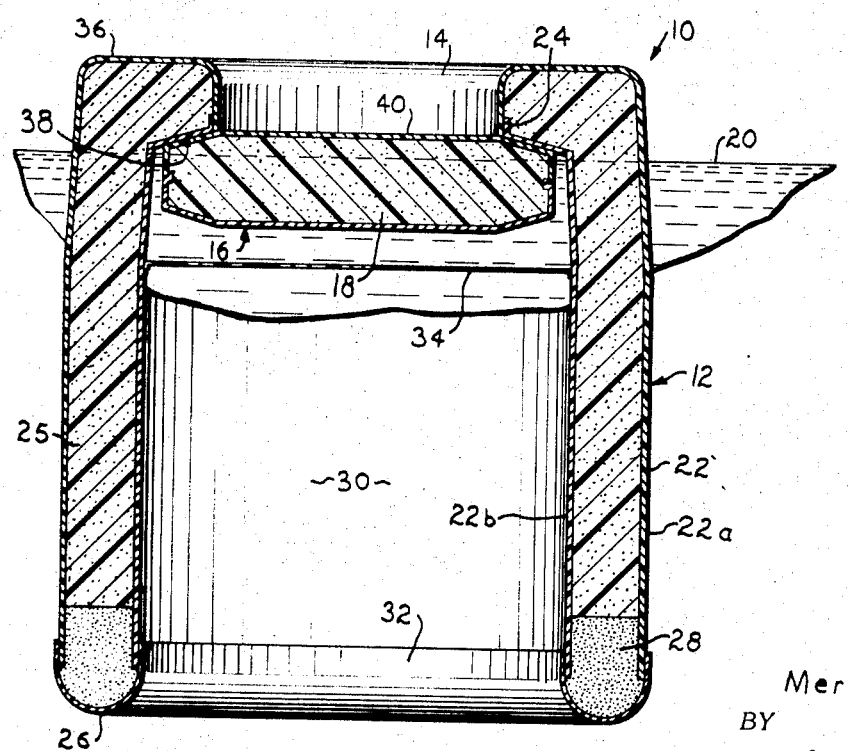
INVENTOR.
Mervin W. Martin
BY
D. A. N. Chase
ATTORNEY INVENTOR.
Mervin W. Martin
BY
D. A. N. Chase
ATTORNEY

CATTLE AND HOG WATERING APPARATUS

This invention relates to stock watering apparatus which may be unattended during prolonged periods of subfreezing weather.

Under wintertime conditions such as commonly encountered in the central and northern regions of the United States, the watering of livestock oftentimes requires the constant attention of the farmer or stockman due to the formation of ice in the open tanks or on the surfaces of ponds. Even once a hole is chopped in the ice to make the water available, a prolonged freeze naturally causes refreezing of the water thereby presenting a continuing problem. Particularly in the raising of cattle and hogs for slaughter, it is desired that the animals drink freely in whatever quantity is desired, thus the problem is particularly acute for cattle and hog raisers besides the obvious inconvenience of having to constantly attend watering tanks and even ponds to break ice formations.

It has been proved by actual tests that cattle and hogs have the intelligence to operate a simple mechanical device to obtain a drink. However, in many of such devices the drinking water rises in a vessel so that the animal may gain access thereto, thereby exposing any residual water to ambient air once the animal has finished drinking. Accordingly, such devices are largely unsuitable for use during periods of subfreezing weather since ice formation is equally a problem as with open tanks and ponds.

It is, therefore, the primary object of the present invention to provide a livestock watering apparatus which will permit animals to obtain a drink at all times and under all temperature conditions, and which need not be attended by the farmer or stockman even during periods of prolonged subfreezing weather.

Another important object of this invention is to provide apparatus as aforesaid which is simple in construction, reliable in operation, and relatively maintenance free.

Still another important object of the invention is to provide apparatus as aforesaid which includes a watering unit adapted for use either in a pond or in a tank, thereby providing practical flexibility in the adaptation of the invention to automatic, unattended watering from either a natural supply or a tank fed by a water supply line.

In the drawings:

FIG. 1 is a perspective view of the watering unit of the present invention;

FIG. 2 is an enlarged, top plan view of the unit of FIG. 1;

FIG. 3 is a central, vertical sectional view of the unit on the same scale as FIG. 2, illustrating the unit floating freely in a natural supply of water;

Figure 5:
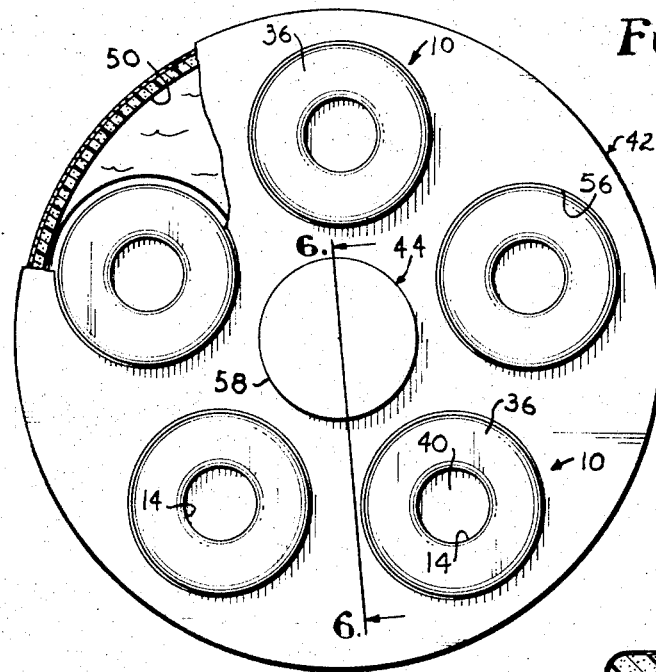
FIG. 5 illustrates the form of the invention utilized in applications where the supply of water is obtained from a tank, and shows a top plan view of such apparatus with which five water units are employed.

Referring initially to FIGS. 1–4, it may be seen that the watering unit broadly denoted by the numeral 10 is of generally cylindrical configuration and comprises an upright vessel 12 provided with an upwardly facing, circular drinking opening 14. As shown in FIG. 3, the opening 14 is normally closed by a disc shaped valve 16 of hollow construction filled with an insulating material 18. It should be understood at this juncture that the vessel 12 is buoyant and floats in water in a partially submerged disposition, as may be appreciated from noting the level 20 of the surface of the water surrounding the vessel 12. The illustration in FIG. 3 depicts the use of the unit 10 in applications where the water supply is a natural source such as a pond.

The valve 16 is also buoyant and, were it not for the confines of the vessel 12 as will be explained, the valve 16 would float high on the surface of the water. With respect to the vessel 12, the sidewall 22 thereof is insulated and is preferably constructed from pressure and vacuum formed sheet plastic to provide the outer and inner wall skins 22a and 22b respectively. The skins 22a and 22b are initially formed as separate pieces of cylindrical configuration which are then cemented together at a circular band 24 surrounding the opening 14 at its base. The annular space between the assembled skins 22a and 22b is filled with a suitable insulating material 25 such as expanded polyurethane. A ring 26 of plastic sheet material serves as a cap on the bottom end of the sidewall 22, and is of U-shaped cross-sectional configuration as may be seen in FIG. 3. The ring 26 and the lower end of the sidewall 22 are filled with a ballast material 28 such as sand in order to hold the vessel 12 partially submerged as discussed above.

From the foregoing, it will be appreciated that a cylindrical chamber 30 is presented within the vessel 12 that is surrounded by insulated sides and an insulated top (valve 16). The vessel 12 has an open bottom 32 communicating with the chamber 30, such bottom 32 providing for the ingress of a quantity of water into the vessel but only from a depth in the water supply that will depend upon the vertical length of the sidewall 22 downwardly from the water level 20. A horizontal screen 34 of large mesh spans the chamber 30 beneath the valve 16 to limit downward movement thereof and prevent the valve from falling out through the open bottom 32 during handling of the unit 10 prior to installation.

The top 36 of the vessel 12 adjacent the drinking opening 14 is presented by an annular, radially inwardly projecting shoulder formed by the sidewall 22 which is completely filled with the insulating material 25. On the inside of the vessel 12, this top shoulder presents an annular valve seat 38 circumscribing the opening 14 and inclined downwardly away from the opening as is clear in FIGS. 3 and 4. The valve 16 has a circular upper surface 40 and is tapered adjacent its circumferential periphery such that an outer, annular portion of the surface 40 mates with the overlying valve seat 38 when the valve 16 is closed. Accordingly, the valve is guided to its fully seated, closed position by the inclined seat 38 and water flow from the surface 40 back into the chamber 30 is facilitated as will be discussed hereinafter.

Figure 6:
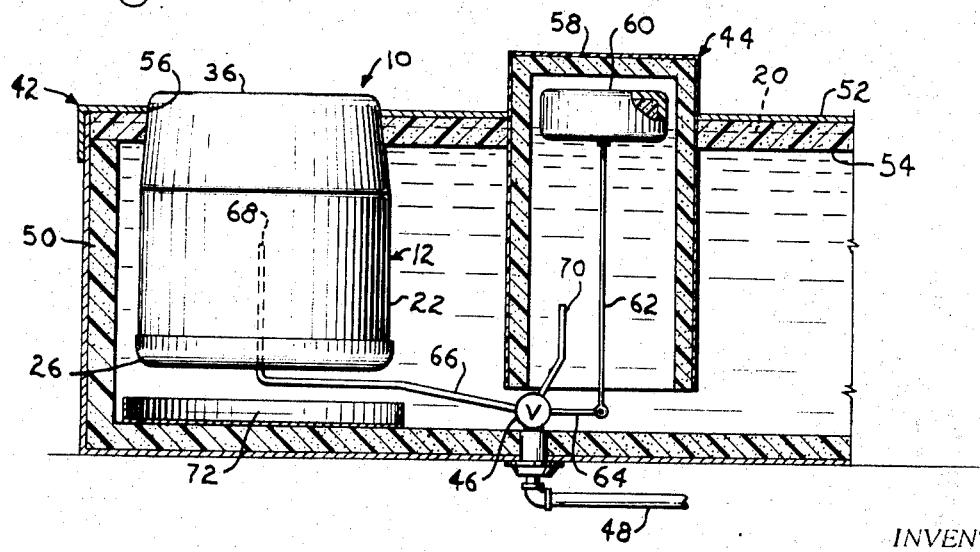
FIG. 6 is an enlarged, fragmentary, cross-sectional view taken along line 6—6 of FIG. 5.

Referring to FIGS. 5 and 6, five of the units 10 are shown in conjunction with a specially equipped stock tank 42. Although any tank configuration may be employed, a circular tank is illustrated herein which accommodates the five units 10 in a circular pattern as seen in FIG. 5, spaced equally from the center of the tank 42. An operating assembly 44 for a flow control valve 46 is mounted in the center of the tank 42, the valve 46 being employed to control the flow of water from a water line 48 into the tank 42.

The tank 42 may comprise a standard metal stock tank modified by the addition of a lining of insulating material 50 on its sidewall and bottom. The water line 48 would commonly be underground to protect against subfreezing weather conditions and is, therefore, communicated with the tank through the bottom thereof. The tank is fitted with a top member or cover 52 which is also lined with insulating material 54.

The cover 52 has five circular apertures 56 therein which receive the top portions of the five water units 10. It may be noted in this respect that approximately the upper one-third of each of the vessels 12 is tapered to fit in the corresponding aperture 56 from below, with the interference limiting the degree to which the top 36 projects above the cover 52.

The control valve operating assembly 44 includes an insulated cylinder 58 closed at its top but open at its bottom and mounted in the center of the cover 52. The cylinder 58 projects upwardly above the cover 52 a sufficient distance to permit a float 60 to ride on the surface of the water in the tank. A connecting rod 62 couples the float 60 to an operating lever 64 for the valve 46, and branch lines 66 are provided on the outlet side of the valve 46 that extend laterally and then upwardly into the units 10, terminating in discharge outlets 68 within the chambers 30. Another branch line 70 extends into the cylinder 58.

It should be understood that the units 10 in FIGS. 5 and 6 are identical in construction to the unit 10 shown in detail in FIGS. 1–4 and described hereinabove. The only difference is a variation in the manner of use, in that the unit 10 in FIGS. 1–4 floats freely while in the tank version of the apparatus the units 10 are held securely by the tank cover 52. Although the ballast 28 is not required in the tank version, it does not interfere in any way with the operation of the apparatus and thus would normally be left in the vessel.

Figure 4:
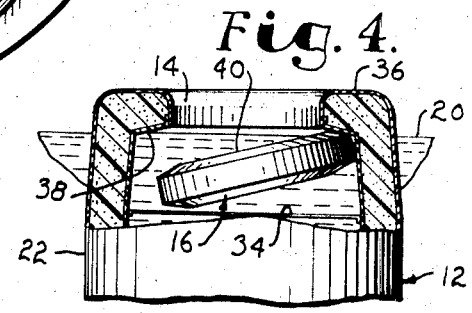
FIG. 4 is a fragmentary view similar to FIG. 3 on a reduced scale illustrating the buoyant valve in an open position.

OPERATION

Where a natural water supply is to be used such as a pond (FIGS. 1–4), the unit 10 is simply placed in the pond and permitted to flaot freely. The amount of the ballast 28 is such that the water level 20 is below the drinking opening 14 but sufficiently high to hold the valve 16 against the seat 38 in the closed position shown in FIG. 3. In mild weather or under conditions where thin ice (readily cracked by the animal) forms at the edge of the pond, the stock will drink from the pond itself. However, under severe conditions when the ice freezes thick, the stock will walk out on the surface of the pond and drink from the unit 10. The animal sticks its head into the opening 14 and pushes the valve 16 downwardly away from the seat 38 against the buoyant force of the water. This would usually be accomplished by a tipping motion of the valve 16 as illustrated in FIG. 4, which causes a major part of the valve to be submerged in the water thereby permitting the animal to drink the water now covering the submerged valve. When the animal finishes drinking and releases the valve 16, it returns to the closed position due to its buoyancy and the water which was covering the upper surface 40 returns to the chamber 30. This is accomplished as the valve recloses and the runback is facilitated by the inclined outer portion of the surface 40, so that little or no water remains above the valve 16 to be subjected to freezing temperatures. Additionally, it is advantageous to construct the valve of a material such as plastic to which water does not readily adhere by freezing, so that in the event a thin layer of water does freeze on the surface 40, it will be readily cracked subsequently by the animal itself as it pushes down on the valve seeking a drink. The valve 16 illustrated herein is constructed of the same materials as the sidewall 22 to provide an outer, plastic skin and a foam core of insulating material, thereby rendering it both highly buoyant and resistant to the adherence of water thereto by freezing.

It should be understood that it is important to provide the valve 16 with adequate insulation as well as the top and side portions of the sidewall structure 22. The insulation in the sidewall should extend downwardly to a depth which is below the expected maximum thickness of ice on the pond. Thus, water is always available at the open bottom 32 of the vessel 12 beneath the ice layer, and the water within the chamber 30 is protected against freezing.

The apparatus illustrated in FIGS. 5 and 6 operates in a similar manner except that the units 10 are resupplied with water by the action of the float 60 and the control valve 46. The float 60 is adjusted to maintain the water level the same as previously described, i.e., below the openings 14 in the units 10 but sufficiently high to hold the buoyant valves 16 seated. This is naturally of great importance since if the water is permitted to deplete to a level which will not hold the valves closed, then the thermal seal is broken and the water in the tank is exposed to ambient air.

The branch lines 66 are purposely run upwardly well into the chambers 30 of the units 10 so that they will be resupplied with the warmest water available (that from the buried water line 48). As in the operation previously described, even some freezing of the water in the tank around the units 10 will not prevent operation of the apparatus as long as liquid water is available at the open bottoms of the units 10 and the internal chambers 30 are maintained free of ice. In this regard, it may be further appreciated that the branch lines 66 are an aid to preventing the formation of ice within the chambers 30, and the branch line 70 assures that the warmest water available is discharged into the insulated cylinder 58 housing the control float 60.

The branch lines 66 are also an aid in summertime watering operations, since under a hot sun the water in the tank will gradually increase in temperature. Accordingly, cooler water from the buried line 48 entering at the chambers 30 within the units 10 assures that the stock will have access to the coolest water available, which encourages the animals to drink.

By securing the units 10 and the cylinder 58 to the cover 52 of the tank 42, cleaning of the entire assembly may be readily accomplished by simply lifting the cover 52 (along with the units 10 and cylinder 58) from the tank body. Particularly when watering hogs, cleaning may be required at relatively frequent intervals, and for this purpose a dirt catching pan 72 may be placed on the bottom of the tank beneath each of the units 10.

Having thus described the invention, what is claimed as new and desired to be secured by Letters Patent is:

1. Animal watering apparatus comprising:
    structure for receiving a quantity of water and having an upwardly facing drinking opening disposed for access by the head of an animal;

a buoyant valve of insulating material in said structure underlying said opening, said structure being provided with means therewithin adjacent said opening presenting a seat for said valve; and means for maintaining the water in the structure at a level below said opening but sufficiently high to hold said valve against said seat in a normal position closing said opening to provide a thermal seal between the water in the structure and ambient air, said valve being movable downwardly away from said seat against the buoyant force of the water to a position in which at least a part of the valve is submerged in response to downward force applied to the valve by the head of an animal seeking a drink, thereby permitting the animal to drink the water covering the submerged part of the valve.

2. The apparatus as claimed in claim 1, wherein said structure includes an upright vessel provided with an insulated top having said opening therein, and an open bottom through which said quantity of water is received, said vessel being adapted for disposition in a supply of water with said bottom submerged, and said vessel being further provided with a sidewall between said top and bottom insulated from said top down toward said bottom a distance sufficient to prevent the water in the vessel from freezing during use of the apparatus under conditions subjecting said supply of water to subfreezing ambient temperatures.

3. The apparatus as claimed in claim 1, wherein said structure includes an upright, buoyant vessel adapted to float freely in a supply of water and being provided with a top having said opening therein, said vessel being further provided with an open bottom through which said quantity of water is received, said level maintaining means comprising a ballast on said vessel for holding the latter partially submerged in said supply of water to a depth at which the water in the vessel rises to said level.

4. The apparatus as claimed in claim 3, wherein said top is insulated, and wherein said vessel has a sidewall between said top and said bottom insulated from said top down toward said bottom a distance sufficient to prevent the water in the vessel from freezing during use of the apparatus under conditions subjecting said supply of water to subfreezing ambient temperatures.

5. The apparatus as claimed in claim 1, wherein said structure includes a water-receiving tank provided with means presenting said drinking opening, and wherein a waterline is provided communicating with said tank, said level maintaining means comprising a flow control valve in said waterline and operating means coupled with said control valve and responsive to depletion of said quantity of water for opening and closing the control valve to maintain the water at said level as water is drunk from the tank.

6. The apparatus as claimed in claim 1, wherein said structure includes a tank adapted to contain a supply of water and having a top member, and an upright vessel in said tank provided with an insulated top having said opening therein and an open bottom through which said quantity of water is received by the vessel, said member being apertured to receive said top of the vessel with said open bottom thereof adapted to be submerged in said supply of water, and wherein a waterline is provided communicating with said tank, said level maintaining means comprising a flow control valve in said waterline and operating means coupled with said control valve and responsive to depletion of said quantity of water for opening and closing the control valve to maintain the water at said level as water is drunk from the tank.

7. The apparatus as claimed in claim 6, wherein said vessel is further provided with an insulated sidewall extending downwardly from said insulated top thereof to present a chamber beneath said drinking opening, and wherein said waterline downstream from said control valve extends upwardly through said open bottom and presents an outlet in said chamber.

8. The apparatus as claimed in claim 1, wherein said seat is of annular configuration, circumscribes said opening, and is inclined downwardly away from said opening, said valve comprising a disc having an upper surface configured adjacent the periphery of the disc to mate with said seat, whereby to facilitate water flow from said surface into said vessel as the valve returns to its normal position after the animal drinks.

* * * * *